United States Patent [19]

Pickering et al.

[11] 4,370,891

[45] Feb. 1, 1983

[54] DUAL ELEMENT-SINGLE OSCILLATOR-RATIO TYPE DIGITAL TRANSDUCER

[75] Inventors: William Pickering, University Heights, Ohio; David J. Urbanc, Peoria, Ill.

[73] Assignee: Caterpillar Tractor Co., Peoria, Ill.

[21] Appl. No.: 283,000

[22] Filed: May 26, 1981

[51] Int. Cl.³ .............................................. G01L 19/04
[52] U.S. Cl. ................... 73/861.03; 73/497;
 73/708; 364/571; 364/703
[58] Field of Search ................ 73/861.03, 290 V, 497,
 73/708, 517 AV, DIG. 1; 331/65; 364/571, 703

[56] References Cited

U.S. PATENT DOCUMENTS

| 2,641,706 | 6/1953 | Dickinson | 250/36 |
| 3,355,949 | 12/1967 | Elwood et al. | 73/345 |
| 3,943,341 | 3/1976 | Corsi et al. | 364/703 |
| 4,208,918 | 6/1980 | Miyamae | 73/708 |
| 4,321,832 | 3/1982 | Runyan | 73/708 |

Primary Examiner—James J. Gill
Attorney, Agent, or Firm—Krass & Young

[57] ABSTRACT

A compensated measurement system utilizing dual sensing elements (10, 12) and a single variable frequency oscillator (14). A common operative association between the sensing elements (10, 12) and the oscillator (14) is achieved by multiplexing. Temperature and supply voltage variations are compensated by generating an output ($f_0$) which is proportional to the ratio of the two generated frequencies ($f_1$, $F_2$).

8 Claims, 3 Drawing Figures

DUAL ELEMENT-SINGLE OSCILLATOR-RATIO TYPE DIGITAL TRANSDUCER

DESCRIPTION

1. Technical Field

This invention relates to systems and circuits for measuring such quantities as pressure, fluid level, and physical position, and particularly to an electronic circuit which permits two sensing elements to be operative in effective association with a common signal generator such as a variable frequency oscillator.

2. Background Art

It is well known to provide a signal representing a quantity to be measured through the use of a transducer having a variable electrical component which forms a part of the tank circuit of an oscillator. By virtue of this arrangement the output frequency of the oscillator varies with changes in the measured quantity and, with requisite stability in the oscillator circuit, frequency can be interpreted as an indication of the measured quantity.

It is also well known to provide compensation for error sources, such as temperature caused changes in electrical component values, through the use of two sensors; one to generate a data signal, and the other to generate a reference which varies only with temperature. The data signal is then refined by subtracting the reference signal value from it.

The utilization of the dual-sensor approach in a variable frequency signal generation system as described above can introduce another error source, i.e., the potential mismatch between the oscillator circuits to which the respective sensors are connected. Though matched under one set of conditions, two oscillator circuits can and do drift apart with changes in temperature, pressure, humidity, etc.

DISCLOSURE OF THE INVENTION

The subject invention provides a dual-sensor measurement system in which the potential error effects of mismatched oscillators are eliminated. This is achieved by time-multiplexing the operative association of the two sensors with a common oscillator or similar signal generator, utilizing gates which are adaptively controlled in accordance with changes in one of the two resulting signal frequencies.

BEST MODE FOR CARRYING OUT THE INVENTION

Figure 1:
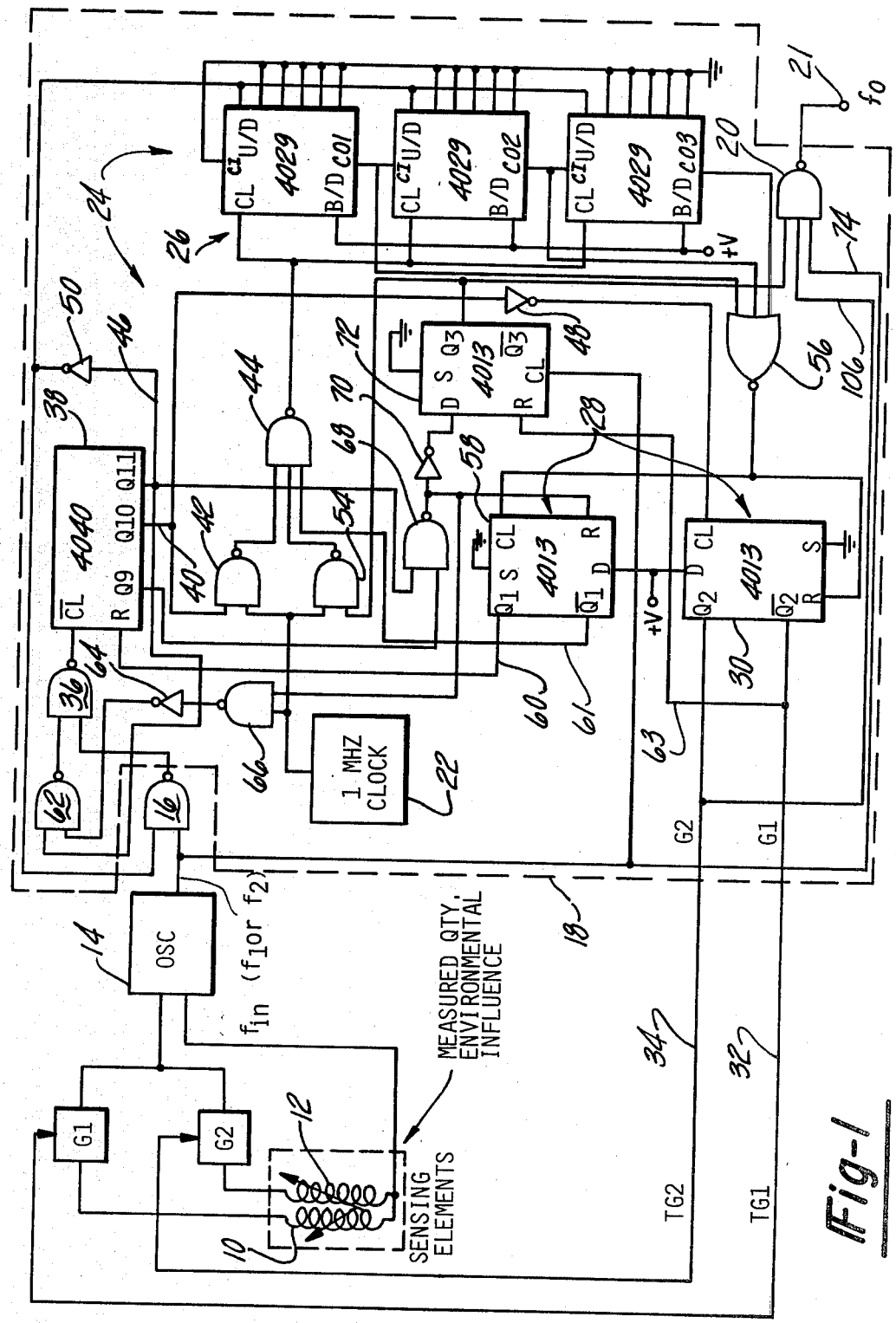
FIG. 1 is a detailed circuit diagram of an apparatus embodying the invention.

FIG. 1 illustrates the embodiment of the invention comprising a matched pair of inductive sensing elements 10 and 12 which reside in respective signal quantity transducers such as linear position detectors. Inductive sensing elements 10 and 12 are connected through complementally operated signal transmission gates G1 and G2 to a common variable frequency oscillator 14 where they alternately act as frequency determining elements; i.e., when its associated gate is conductive, each of the sensing elements 10 and 12 is connected into the tank circuit of oscillator 14 to establish an output frequency of the oscillator in accordance with the electrical impedance or reactance value represented by that element.

Figure 3:
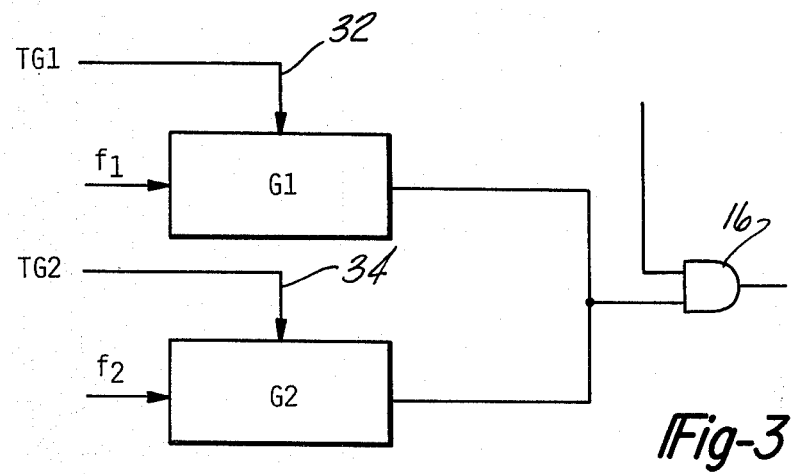

Moreover, the logic circuit 18 described above may be readily adapted for use in an arrangement wherein the sensing elements 10 and 12 are respectively coupled to independent corresponding oscillators having differing output frequencies $f_1$ and $f_2$. For example, as shown in FIG. 3, the sensing elements 10 and 12 can be coupled to separate oscillators whose outputs, which are of differing frequencies, are delivered directly to the inputs of gates G1 and G2 as signals $f_1$ and $f_2$ respectively. The outputs of gates G1 and G2 which are of frequencies $f_1$ and $f_2$ respectively, are alternately delivered directly to the input of gate 16 and the remaining operation of the logic circuit 18 is essentially identical to that described previously.

Sensing elements 10 and 12 are preferably selected and located to exhibit similar, i.e., matched, responses to environmental conditions such as temperature. In other words, a given variation in the ambient temperature produces the same magnitude and sense of change in electrical character for each of the two elements. However, the sensing elements 10 and 12 are conditioned with respect to the measured quantity to respond in opposite sense; for example, where the sensing elements 10 and 12 are employed in a movable core type linear position detector, the cores of the respective sensing elements 10 and 12 are either mechanically interconnected or joined as a common core such that a positional change in the device being monitored moves one core farther into its associated inductor and the other core farther out of its associated inductor to produce electrical value changes of opposite sense. This is given merely by way of example as it will be immediately appreciated that the same result can be achieved using resistors and capacitors as well as a combination of electrical components.

The time multiplexed outputs of the oscillator 14 are connected through wave shaping buffer 16, which may comprise an inverter, NAND gate or the like, to a logic circuit control means 18 which produces an output signal at NAND gate 20 related to the ratio of the two input signal frequencies, hereinafter called $f_1$ and $f_2$. In addition, circuit 18 operates and adaptively sets the timing of the gates G1 and G2 in accordance with changes in the frequency $f_1$.

The principal elements of the circuit 18 comprise a one MHz clock source 22, a logic circuit 24 for connecting the clock 22 to a bank of 4029 counters 26 in both up and down count modes, a pair of 4013 flip-flops 28 which control the various components of circuit 18 as well as the conductivity of the two transmission gates G1 and G2, and a synchronizing circuit comprising a 4013 flip-flop 72 which synchronizes the repetition rates $f_1$ and $f_2$ in order to prevent an erroneous, additional count from being delivered to the output 21.

It will be noted that industry standard numbers for commercially available integrated circuits are utilized herein wherever possible.

Describing the circuit in FIG. 1 in greater detail, timing signals generated by the complemental outputs of flip-flop 30 on lines 32 and 34 render gates G1 and G2 alternately conductive. Assuming for the moment that line 32 is high and line 34 is low, gate G1 is rendered conductive and therefore couples sensing element 10 with the input of oscillator 14; this results in the production of an oscillator output having the frequency $f_1$. The $f_1$ frequency signal is passed through NAND gates 16 and 36 to the input of counter 38. Counter 38 is of a 4040 type which acts as a frequency divider and includes outputs Q9, Q10 and Q11 that provide output pulses which are time divided multiples of the input frequency; for example, the Q10 output provides a divsion factor of 512. After the prescribed number of pulses of the input frequency $f_1$ are received by the counter 38, the Q10 output goes high. The high pulse from the Q10 output is delivered via line 40 to one input of NAND gate 42, the second input thereto being connected to the output of the one megahertz clock 22. Consequently, the high output pulse from output Q10 enables NAND gate 42 to pass the one megahertz clock signal through NAND gate 44 to the clock inputs of the counters 26. At this point, the Q11 output of counter 38 is low; this low is inverted to a high signal by inverter 50, which in turn is delivered to one input of the buffer 16 as well as to the up/down input of each of the counters 26.

A high signal on the up/down inputs of counters 26 places the latter in a count-up mode, consequently, the counter 26 begin counting up the pulses of the one megahertz clock signal as long as the Q10 output of counter 38 remains high. It may thus be appreciated that the total magnitude of the count accumulated by counters 26 is determined by the duration of the Q10 output pulse which is in turn inversely proportional to the input frequency $f_1$. It should be noted here that the clock signal is of arbitrarily selected frequency in that it is not related to either of the varying frequency signals which respond to measured quantity changes; however, the clock signal frequency is preferably high in proportion to frequencies $f_1$ and $f_2$. In any event, when the Q10 output goes low, the Q11 output simultaneously goes high. The low signal from the Q10 output is inverted to a high signal by inverter 48 which is then delivered to the clock input of flip-flop 30; flip-flop 30 is responsive to change the status of the signals on lines 32 and 34, i.e., line 32 goes low and line 34 goes high. At this point, gate G2 couples sensing element 12 with the input of oscillator 14 which then generates frequency $f_2$. The low signal from Q10 disables gate 42 and removes the clock signal from NAND gate 44 and the clock inputs of counter 26.

The high signal from the Q11 output is changed to a low state by inverter 50; this low signal switches the counter 26 into a down-count mode and is also delivered to one input of the buffer 16, thereby disabling the output of the latter so as to interrupt delivery of pulses from the oscillator 14 through gate 36 to the counter 38. The high signal from the Q11 output is also delivered through NAND gate 68 to NAND gate 66; gate 66 is responsive to pass the one megahertz clock signal through inverter 64 and through gates 62 and 36 to the input of counter 38 which then processes the incoming one megahertz clock signal. The time interval during which the counter 38 processes the one megahertz clock signal provides a delay period during which the output frequency of the oscillator 14 is being switched from $f_1$ to $f_2$. This delay period allows the output of the oscillator 14 to stabilize on frequency $f_2$ immediately following the switching of gates G1 and G2.

Counter 38 processes the one megahertz clock signal until the Q9 output goes high. Simultaneous high signals on outputs Q9 and Q11 are processed by gates 68 and 66 which function to terminate delivery of the one megahertz clock signal to the counter 38. Additionally, simultaneous highs on the Q9 and Q11 outputs pass through gate 68 and inverter 70 to flip-flop 72 which is set by the next $f_2$ pulse. Flip-flop 72 then delivers a high signal to NAND gate 54 which allows the one megahertz clock signal to be delivered from the clock 22 through NAND gate 44 to clock inputs of the counters 26. With the counters 26 in a count-down mode (as a result of the Q11 output having gone low), the counters 26 commence counting down in accordance with the one megahertz clock signal. The setting of flip-flop 72 also results in the delivery of a gating signal from the Q3 output of flip-flop 72 to one input of NAND gate 20, two additional inputs to NAND gate 20 being respectively coupled to line 34 via line 106 and to the output of oscillator 14 via line 74. Thus, the gating signal from the Q3 output of flip-flop 72 causes NAND gate 20 to deliver a synchronized frequency $f_2$ signal to the output terminal 21.

When the counters 26 count down to zero, high output signals from the carry-out lines CO1,-CO2, CO3 of counters 26 are delivered to the inputs of NOR gate 56 causing the latter to produce a signal on its output. The output signal from gate 56 clocks (sets) flip-flop 58 and resets flip-flop 30. In response to the set signal, flip-flop 58 delivers a signal on line 60 which resets the counter 38. With counter 38 reset, the Q9, Q10 and Q11 outputs go low; the low signal on the Q11 output is inverted by inverter 50 and places the counters 26 in the up-count mode. Simultaneous with the resetting of counter 38, flip-flop 58 also delivers a signal on line 61 to one input of NAND gate 44 which disables the latter's output to terminate delivery of the one megahertz clock signal to the counters 26. Thus, the counters 26 count down to zero and remain at a zero count until subsequently placed in the count-up mode by a low signal on the Q11 output. Resetting of flip-flop 30 by the output of gate 56 causes lines 32 and 34 to be reset to their original states, i.e., line 32 is high and line 34 is low. Resetting of flip-flop 30 also results in a reset signal being delivered on line 63 to the reset input of flip-flop 102. Upon resetting of flip-flop 72, the Q3 output thereof goes low and the output of gate 20 is disabled. At this point, the circuitry has returned to its original starting condition in preparation for the next counting cycle.

Figure 2:
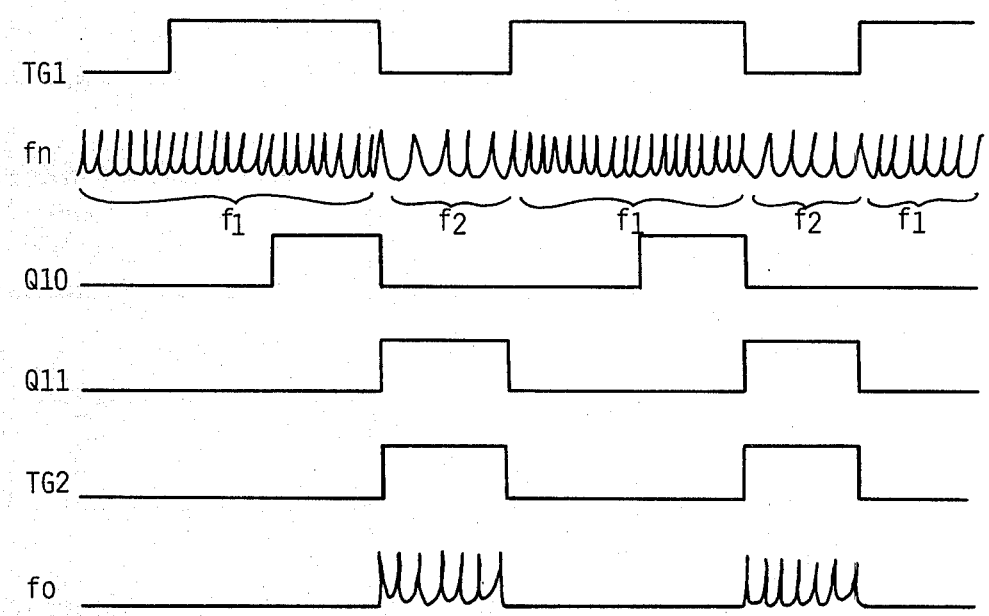
FIG. 2 is a chart of signal waveforms which are generated in the circuit of FIG. 1; and, FIG. 3 is a detailed circuit diagram of a modified portion of the apparatus shown in FIG. 1.

The output $f_0$ of gate 20 (shown in FIG. 2) is, by reason of the foregoing apparatus and operation thereof, proportional to the ratio of the signal frequency $f_1$ and $f_2$ and remains stable despite environmental quantity variations which swing the electrical values of sensor elements 10 and 12 in like sense. However, as the signal frequency values $f_1$ and $f_2$ vary in opposite sense, the ratio clearly changes as a strong and easily processed electrical signal indicator of the measured quantity.

INDUSTRIAL APPLICABILITY

The method and apparatus described in the foregoing is applicable to a wide variety of precise measurement applications but may be readily understood by reference to the application to linear position measurement in an environment of changing temperature.

As is described above inductive sensing element 10 is provided with an internally movable core or core portion which is mechanically connected to the device whose position is to be monitored whereby the core moves farther into the inductive element 10 with a rightward movement and farther out of the element with a leftward movement. Conversely, the inductive sensing element 12 is provided with a movable internal core or core portion which is mechanically connected to the device being monitored in such a fashion as to move the core farther out of the element with a rightward movement of the device and farther into the element with a leftward movement of the device. As a result, the two inductive elements 10 and 12 respond in the same sense to temperature changes but in opposite sense to movement of the element whose position is to be measured.

Operation of the circuit 18 in the fashion described above produces a time multiplexed series of signals $f_1$ and $f_2$ which are applied to the circuit 18 through gate 16. Counter 38 operates to divide the $f_1$ signal and produces a gating pulse on the Q10 output thereof whose duration is inversely proportional to the frequency of the $f_1$ signal. During the period of the gating pulse on the Q10 output, pulses from the one MHz clock 22 are stored in the counter 26 as a count-up function. Because the frequency of clock 22 is fixed, the pulse count in counters 26 represents a fixed time period which can be regenerated by counting down to zero. At the termination of the Q10 gating pulse, the gates G1 and G2 are toggled and $f_2$ is applied to the output by way of gate 20 for exactly the period set by $f_1$ so the relevant periods of $f_1$ and $f_2$ remain in fixed ratio despite changes in $f_1$. At the same time, clock pulses are applied through gates 54 and 44 to count the counter banks 26 to zero. When the zero count is reached, the output 20 ceases and the circuit is reconditioned to the quiescent state for the next cycle of operation.

The processing of the signal from output gate 20 may be varied to suit the particular user; however, it is contemplated that the number of $f_2$ pulses which occur during the gating pulse time will be counted and averaged as an indication of the ratio of $f_1$ and $f_2$. The signal, because of its form, is readily adaptable to a modern signal processing and data storage equipment as will be apparent to those skilled in the art.

It is to be understood that the invention has been disclosed with reference to illustrative embodiments and that various modifications and additions will be apparent to those skilled in the art. It should be further understood that the invention may be adapted to applications other than the measurement of linear position. Examples are the measurements of pressure, humidity, liquid level, light level and acoustic conditions. Similarly, the circuit may be rendered insensitive to environmental conditions other than temperature; examples are humidity and air pressure. Other aspects, objects and advantages of this invention can be obtained from a study of the drawings, the disclosure and the appended claims.

We claim:

1. In a measuring system having a single signal generator (14) connected to first and second sensing elements (10, 12), said generator (14) being adapted to deliver one of first and second signals ($f_1$, $f_2$) each being responsive to one of the first and second sensing elements (10, 12), said sensing elements (10, 12) being adapted to sense at least one variable condition at respective first and second locations and deliver a respective signal to the generator (14) in response to said sensed condition, the improvement comprising:

first and second gates (G1, G2) each connected between a respective sensing element (10, 12) and the generator (14) and each being adapted to control the delivery of the respective sensing element signal to the generator; and control means (18) for receiving the signals ($f_1$, $f_2$) from the generator (14) and sequentially operating the gates (G1, G2) in response to the period of one of the signals ($f_1$, $f_2$).

2. Apparatus, as set forth in claim 1, wherein the signal generator includes an oscillator (14) and said gates (G1, G2) connect the sensing element (10, 12) to said oscillator (14).

3. Apparatus, as set forth in claim 2, wherein the control means (18) includes logic means (24, 28) for receiving a first variable frequency output portion ($f_1$) from the oscillator (14) in response to the signal from the first sensing element (10) and producing a gating pulse, said gating pulse varying inversely in duration with the frequency of said output portion ($f_1$); and, output gate means (20) for receiving a second variable frequency output portion ($f_2$) from the oscillator (14) in response to the signal from the second sensing element (12) and for receiving, as an enabling signal, a delayed reproduction of the gating pulse and passing the second variable frequency output portion ($f_2$) only during receipt of said delayed reproduction.

4. Apparatus, as set forth in claim 3, wherein the logic means (24, 28) includes:

first clock means (22) operative during the first variable frequency output portion ($f_1$) for producing a count proportional to the duration of said gating signal;

first counter means (26) for receiving and storing the count;

signal means (40, 46) for simultaneously reversing the count and initiating the gating pulse; and, first switch means (58) for terminating the reverse count and the gating pulse in response to the count being reduced to its initial value.

5. Apparatus, as set forth in claim 4, wherein said logic means (24, 28) includes second switch means (30) for controlling the conductivity of said gates (G1, G2).

6. Apparatus, as set forth in claim 4, wherein the logic means (24, 28) includes second counter means (38) for dividing the frequency of said first signal ($f_1$) and producing said gating pulse.

7. Apparatus, as set forth in claim 4, wherein the switch means (58) is a flip-flop.

8. Apparatus, set forth in claim 1, wherein the control means (18) includes digital circuitry (38, 24, 26, 28, 30, 20, 72) producing an output in response to the ratio of the output signal values of one of signals $f_1$ and $f_2$ divided by the other of signals $f_1$ and $f_2$ of the signal generator (14).

* * * * *